(12) United States Patent
Lee et al.

(10) Patent No.: US 11,579,551 B2
(45) Date of Patent: Feb. 14, 2023

(54) BELT COMPRISING COATING LAYER COMPRISING INORGANIC-ORGANIC NANOCOMPOSITE MATERIALS, AND FUSING APPARATUS AND GLOSS-ENHANCING APPARATUS COMPRISING THE SAME

(71) Applicant: Hewlett-Packard Development Company, L.P., Spring, TX (US)

(72) Inventors: Sunhyung Lee, Suwon (KR); Seung-Jun Lee, Suwon (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/415,105

(22) PCT Filed: Jan. 31, 2020

(86) PCT No.: PCT/US2020/016077
§ 371 (c)(1),
(2) Date: Jun. 17, 2021

(87) PCT Pub. No.: WO2020/263344
PCT Pub. Date: Dec. 30, 2020

(65) Prior Publication Data
US 2022/0179344 A1 Jun. 9, 2022

(30) Foreign Application Priority Data
Jun. 27, 2019 (KR) .......................... 10-2019-0077019

(51) Int. Cl.
*G03G 15/20* (2006.01)

(52) U.S. Cl.
CPC .............................. *G03G 15/2057* (2013.01)

(58) Field of Classification Search
CPC .................................................. G03G 15/2057
See application file for complete search history.

(56) References Cited

U.S. PATENT DOCUMENTS

| | | | |
|---|---|---|---|
| 5,547,759 A * | 8/1996 | Chen | ..................... B32B 27/322 428/463 |
| 5,778,295 A | 7/1998 | Chen et al. | |
| 6,501,934 B1 | 12/2002 | Ahuja et al. | |
| 6,985,690 B2 | 1/2006 | Odell et al. | |
| 8,216,661 B2 | 7/2012 | Kelly et al. | |
| 2007/0026225 A1 * | 2/2007 | Chen | ..................... B32B 27/38 428/447 |
| 2007/0031615 A1 | 2/2007 | Nair et al. | |
| 2012/0244469 A1 | 9/2012 | Zwartz et al. | |

FOREIGN PATENT DOCUMENTS

| | | |
|---|---|---|
| JP | 2009229776 A | 10/2009 |
| JP | 2011232376 A | 11/2011 |

* cited by examiner

*Primary Examiner* — Clayton E. LaBalle
*Assistant Examiner* — Michael A Harrison
(74) *Attorney, Agent, or Firm* — Foley & Lardner LLP

(57) ABSTRACT

Provided is an endless belt that can be used for fusing a toner image or enhancing the gloss of a toner image, the endless belt including a substrate later and a release layer on the substrate layer. The release layer can include a coating layer that includes an inorganic-organic nanocomposite material in which inorganic nanoparticles are dispersed in a siloxane polymer matrix.

19 Claims, 11 Drawing Sheets

BELT COMPRISING COATING LAYER COMPRISING INORGANIC-ORGANIC NANOCOMPOSITE MATERIALS, AND FUSING APPARATUS AND GLOSS-ENHANCING APPARATUS COMPRISING THE SAME

CROSS-REFERENCE TO RELATED APPLICATIONS

This application claims priority to KR Application KR 10-2019-0077019 filed Jun. 27, 2019, which is incorporated by reference as if entirely set forth herein.

BACKGROUND

In electrophotographic imaging apparatuses such as facsimile machines, printers, copy machines, and the like, toner is supplied to an electrostatic latent image formed on an image receptor to form a visible toner image on the image receptor, the toner image is transferred onto a recording medium, and then the transferred toner image is fixed or fused on the recording medium.

A fusing process includes a process of applying heat and pressure to toner. Generally, a fusing apparatus includes a heating roller and a pressing roller that are engaged with each other to form a fusing nip. The recording medium onto which the toner image has been transferred is subjected to heat and pressure while passing through the fusing nip, and the toner image which is highly glossy is fused on the recording medium. When a higher-gloss image is required, a gloss-enhancing apparatus (also may be referred to as a photo-finishing apparatus) which further enhances gloss of a fused image by heating and cooling the fused image again may be further used. To achieve high-speed printing and low-energy fusing, a belt that has a small heat capacity can be used in the fusing process and the gloss-enhancing process. In order to stably form a high-gloss image for a long period of time, a high gloss on a surface of a belt for fusing a toner image or enhancing gloss of a toner image (hereinafter, may be simply referred to as a "belt") may be maintained over a long period of time by increasing the gloss and abrasion resistance of the surface of the belt.

BRIEF DESCRIPTION OF THE DRAWINGS

In FIGS. 11 to 14, a unit of glossiness on the y-axis is a gloss unit (GU).

DETAILED DESCRIPTION

Hereinafter, an endless belt according to some examples of the present disclosure to fuse a toner image or to further enhance the gloss of a fused toner image, a fusing apparatus and/or a gloss-enhancing apparatus, and an imaging apparatus each employing the endless belt will be described.

In a fusing process using a endless fusing belt for fusing a toner image (hereinafter, also referred to as a "fusing belt" or a "belt"), the fusing belt can be located between a pressing member that is arranged inside the fusing belt and a pressing roller (i.e., a backup roller), and the pressing member and the pressing roller can press against each other to form a fusing nip. In this case, the fusing belt can be rotated while being in contact with the pressing member, and the fusing belt may be worn down, which can result in a shortened lifespan and/or deteriorated fusing performance. Therefore, to stably form a high-gloss image for a long period of time by reducing abrasion of the fusing belt, the high gloss of a surface of the fusing belt can be maintained by increasing the gloss and abrasion resistance of the surface of the fusing belt. This may also apply to a belt for enhancing the gloss of a toner image used in a gloss-enhancing apparatus.

Figure 1:
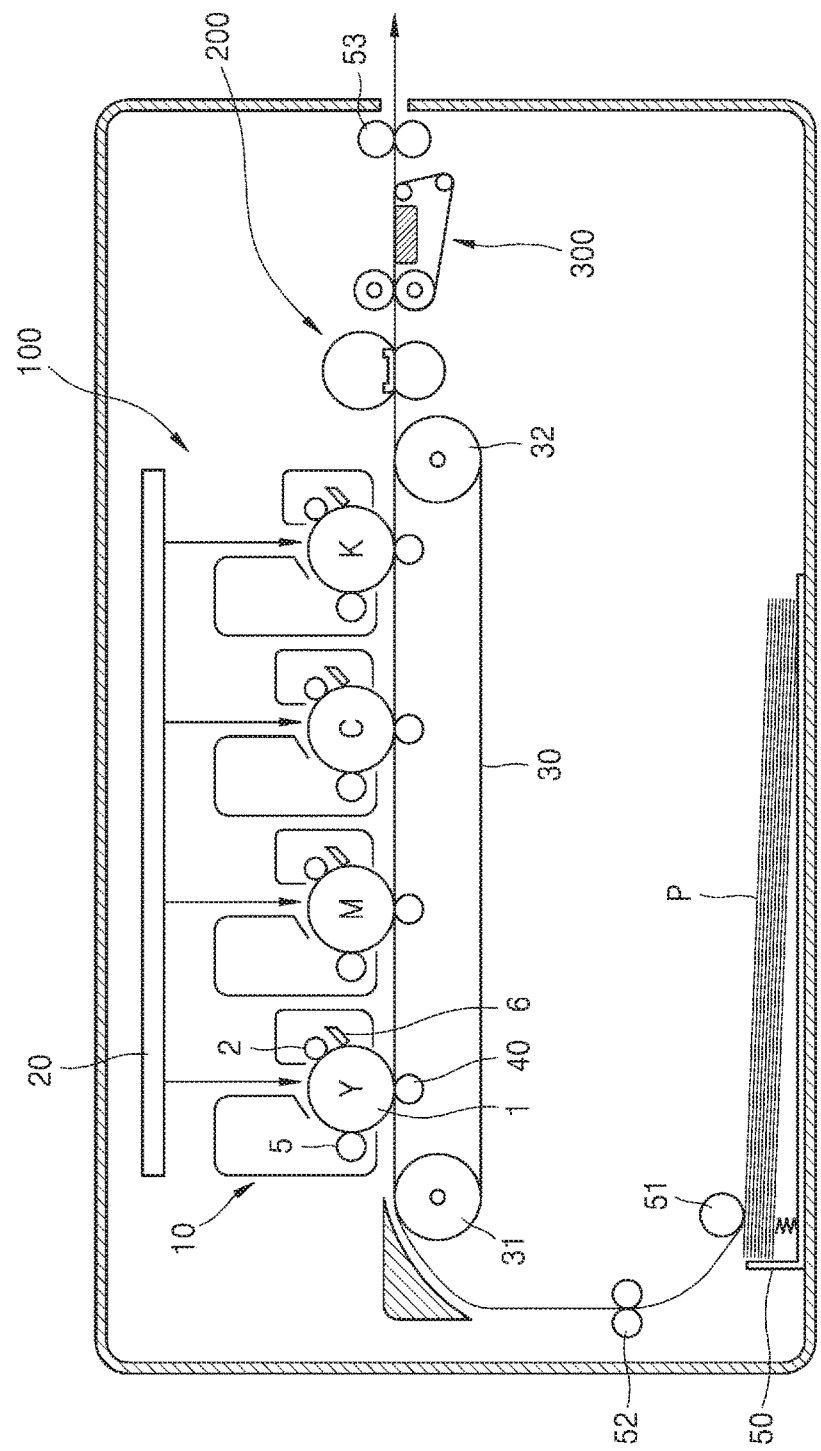
FIG. 1 is a schematic configuration view of an electrophotographic imaging apparatus according to an example of the present disclosure.

FIG. 1 is a schematic configuration view of an electrophotographic imaging apparatuses according to an example of the present disclosure. Referring to FIG. 1, the imaging apparatus may include: a printing unit 100 configured to form a toner image on a recording medium P, for example, paper; and a fusing apparatus 200 configured to fuse the toner image, and a gloss-enhancing apparatus 300. The printing unit 100 may include a plurality of photosensitive drums 1, a plurality of developing devices 10, and a paper transfer belt 30. The plurality of the developing devices 10 respectively correspond to the plurality of photosensitive drums 1, and each developing device 10 supplies toner to an electrostatic latent image formed on each photosensitive drum 1 and develops the electrostatic latent image to form a toner image on a surface of each photosensitive drum 1. For color printing, the plurality of developing devices 10 may include a plurality of developing devices 10Y, 10M, 10C, and 10K configured to receive toner of yellow (Y), magenta (M), cyan (C), and black (K) colors, respectively. The developing device 10 can supply toner accommodated therein to an electrostatic latent image formed on the photosensitive drum 1 and develops the electrostatic latent image into a toner image. The developing device 10 may include a developing roller 5. The developing roller 5 can supply toner in the developing device 10 to the photosensitive drum 1. A charging roller 2 is an example of a charger configured to charge the photosensitive drum to have a uniform surface potential. A cleaning blade 6 can be configured to remove toner and impurities remaining on the surface of the photosensitive drum 1 after the transfer of the toner image onto a recording medium. An exposer 20 can emit light modulated to correspond to image formation to photosensitive drums 1Y, 1M, 1C, and 1K to form electrostatic latent images corresponding to images of yellow (Y), magenta (M), cyan (C), and black (K) colors on the photosensitive drums 1Y, 1M, 1C, and 1K, respectively. In some examples, a laser scanning unit (LSU) using a laser diode as a light source or a light-emitting diode (LED) exposer using an LED as a light source may be used as the exposer 20. The paper transfer belt 30 can support and transfer the recording medium P. The paper transfer belt 30 may be supported by, for example, support rollers 31 and 32, and the paper transfer belt can circulate. The recording medium P may be picked up one-by-one from a loading frame 50 by a pickup roller 51, transported by a transporting roller 52, and then attached to the paper transport belt 30 by, for example, an electrostatic force. A plurality of transfer rollers 40 may be arranged at positions facing the plurality of photosensitive drums 1Y, 1M, 1C, and 1K, with the paper transport belt 40 arranged between the plurality of transfer rollers 40 and the plurality of photosensitive drums.

The fusing apparatus 200 may apply heat and pressure to the image transferred onto the recording medium P to fuse the transferred image on the recording medium P. The recording medium P loaded on the loading frame 50 can be supplied to the paper transfer belt 30 by the pickup roller 51 and the transporting roller 52, and can be held on the paper transfer belt 30 by, for example, an electrostatic force. The toner images of Y, M, C, and K colors can be sequentially transferred onto the recording medium P transported by the paper transfer belt 30, by the transfer bias voltage applied to the plurality of transfer rollers 40. When the recording medium P passes through the fusing apparatus 200, the toner image is fused on the recording medium P by heat and pressure. In order to further increase the gloss of the toner image, the imaging apparatus may further include a gloss-enhancing apparatus 300. For example, after passing through the fusing apparatus 200, the recording medium P having the toner image fused thereon goes on further to pass through the gloss-enhancing apparatus 300. The gloss-enhancing apparatus 300 may be able to provide the fused toner image with a high gloss and a high quality by heating, cooling, and separating the fused toner image. The recording medium P which has passed through the fusing and glass enhancement processes can be discharged by a discharge roller 53.

Figure 2:
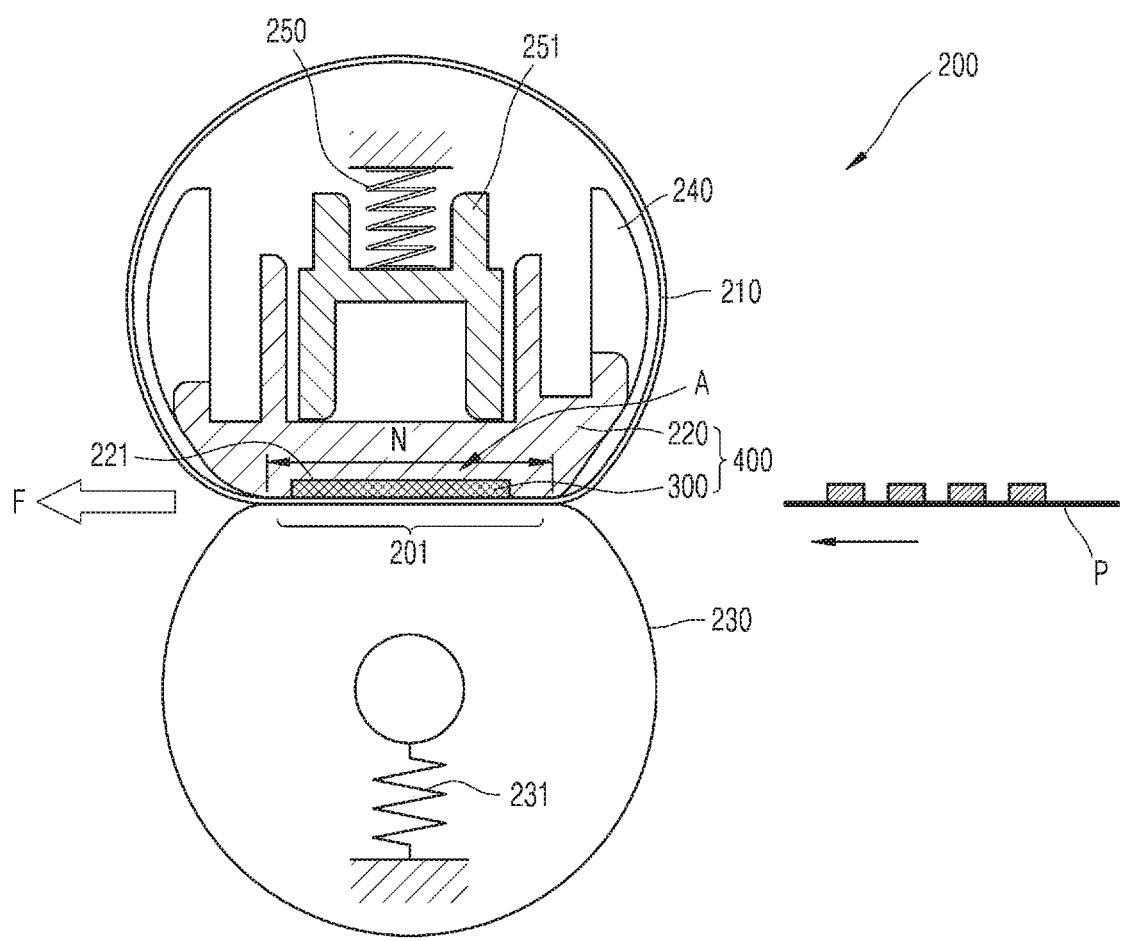
FIG. 2 is a cross-sectional view of a fusing apparatus according to an example of the present disclosure, which may be installed in the electrophotographic imaging apparatus of FIG. 1.

FIG. 2 is a cross-sectional view of the fusing apparatus 200 according to an example of the present disclosure, which may be installed in the electrophotographic imaging apparatus of FIG. 1.

Referring to FIG. 2, the fusing apparatus 200 includes an endless belt 210 that is rotatable, a heating unit 400 provided inside the endless belt 210, and a backup member 230 provided outside the endless belt 210 and configured to form a fusing nip 201 while facing the heating unit 400. The heating unit 400 can also be referred to as "a heating device." The backup member 230 may be, for example, a backup roller (i.e., a pressing roller) and may be arranged to be provided outside the endless belt 210 and in contact with the endless belt 210, such that the backup member 230 and the heating unit 400 press against each other with the endless belt 210 therebetween, thereby driving the endless belt 210 in a direction F indicated by an arrow. The heating unit 400 can be provided inside the endless belt 210, provided opposite to the backup member 230 to form the fusing nip 201, and can heat the endless belt 210 in the fusing nip 201. In some examples, the heating unit 400 includes: a pressing member 220 provided with a concave recess A at a position corresponding to the fusing nip 201 and a heater 300 provided in the recess A.

The backup member 230 that faces the heating unit 400 can be located outside the endless belt 210. The heating unit 400 and the backup member 230 can press against each other with the endless belt 210 disposed therebetween. For example, a pressing force acting towards the backup member 230 may be applied, by a first pressing member (e.g., a spring 250) to opposite end portions of the heating unit 400 in a width direction perpendicular to a direction in which the endless belt 210 circulates. As illustrated in FIG. 2, the spring 250 may also press the heating unit 400 with a metal bracket 251 disposed therebetween. A pressing force acting towards the heating unit 400 may also be applied to the backup member 230 by a second pressing member (e.g., a spring 231). The backup member 230 may drive the endless belt 210. For example, the backup member 230 may be a backup roller or a pressing roller configured such that an elastic layer is formed on an outer circumferential surface of a metallic core. The backup member 230 may rotate while pressing against the heating unit 400 with the endless belt 210 disposed therebetween, thereby driving the endless belt 210. The heating unit 400 can form the fusing nip 201 along with the backup member 230, and can guide the endless belt 210 to be driven. A belt guide 240 may be further provided at an outer side of the fusing nip 201 to enable endless belt 210 to be smoothly driven. The belt guide 240 may be integrally formed with the heating unit 400, and may be a separate member from the heating unit 400. An unfused toner image on the surface of the recording medium P which passes through the fusing nip 201 can be softened by the heat and fused to the recording medium P by a pressing force.

As described above, the heating unit 400 includes the pressing member 220 configured to form the fusing nip 201 while facing the backup member 230; and the heater 300 configured to heat the endless belt 210 in the fusing nip 201. In other words, in the heating unit 400 of the present example, the pressing member 220 configured to form the fusing nip 201 and the heater 300 may be integrally formed. The heater 300 of the present example may be a flexible heater having elasticity.

Figure 3:
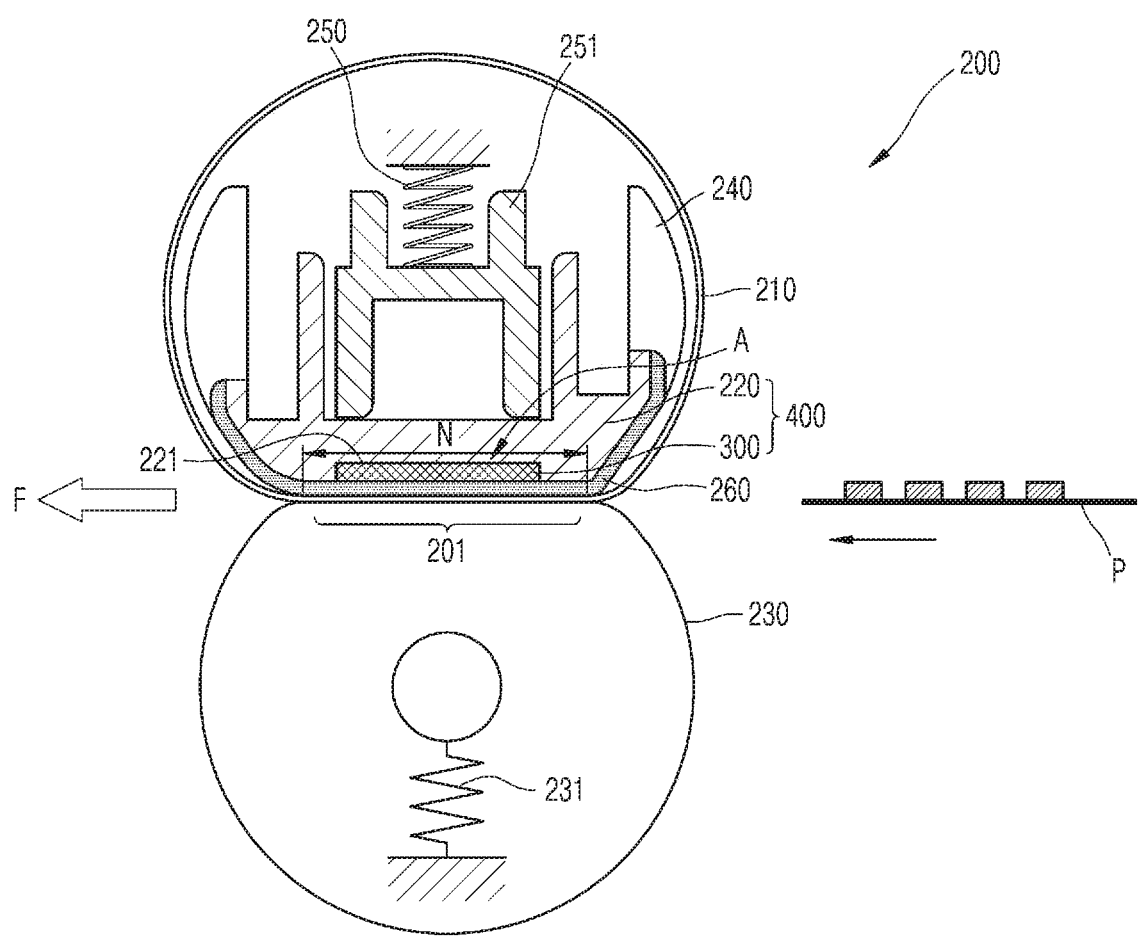
FIG. 3 is a cross-sectional view of a fusing apparatus according to another example of the present disclosure, which may be installed in the electrophotographic imaging apparatus of FIG. 1.

FIG. 3 is a cross-sectional view of the fusing apparatus 200 according to another example of the present disclosure, which may be installed in the electrophotographic imaging apparatus of FIG. 1.

FIG. 3 is a cross-sectional view of the fusing apparatus 200 according to another example of the present disclosure. The fusing apparatus 200 illustrated in FIG. 3 differs from the previous example in that a thermally conductive plate 260 is provided between the heater 300 and the endless belt 210. The thermally conductive plate 260 may be, for example, a thin metal plate. By placing the thermally conductive plate 260 between the heater 300 and the endless belt 210, heat from the heater 300 may be uniformly transferred to the belt 210. In addition, the width of the thermally conductive plate 260 may be adjusted to a width N or more of the fusing nip 201, thereby extending a range of heat transfer to the recording medium P, resulting in further enhanced fusability. In this case, a lubricant may be applied between the endless belt 210 and the thermally conductive plate 260.

The above-described fusing belt may have high thermal conductivity and improved crack resistance, and thus a fusing device and an imaging apparatus each employing the fusing belt may be used in high-speed printing and low-energy fusing methods.

Figure 4:
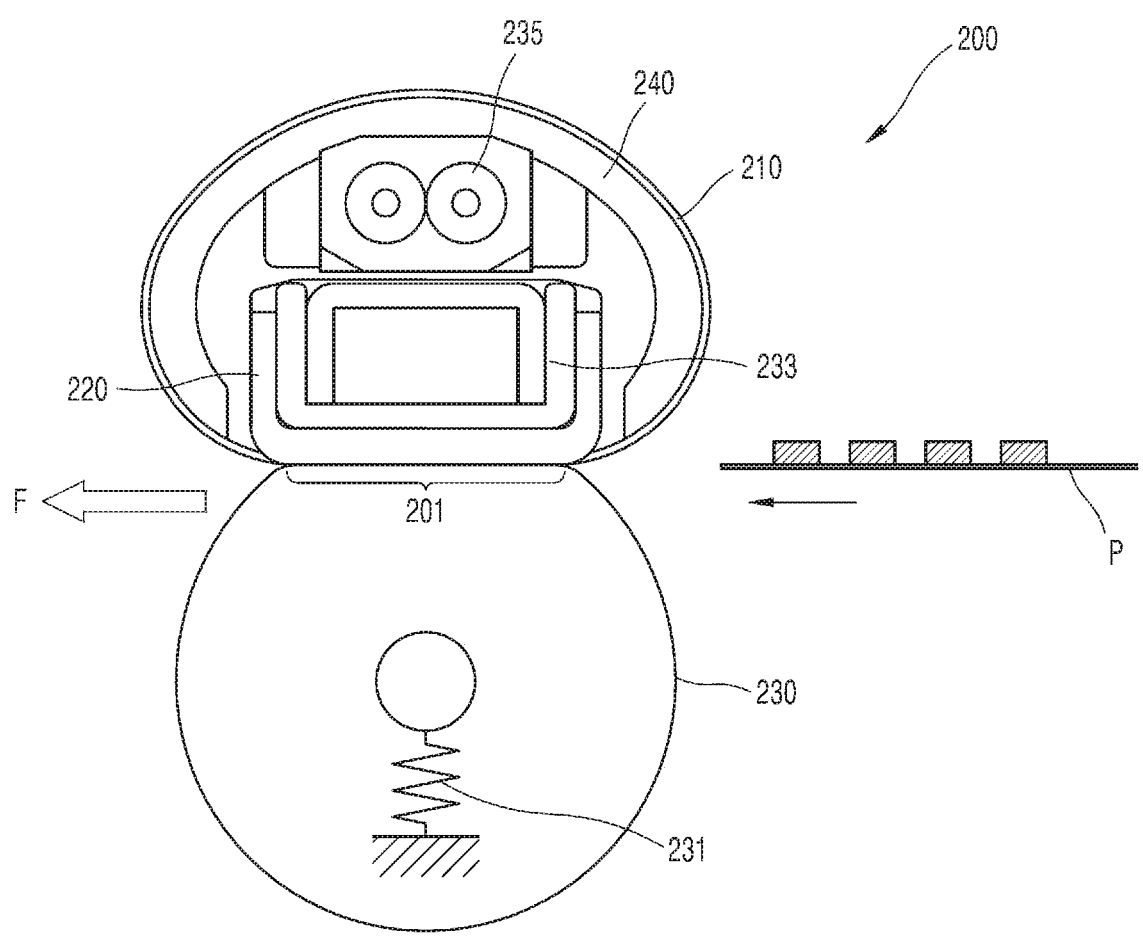
FIG. 4 is a cross-sectional view of a fusing apparatus according to another example of the present disclosure, which may be installed in the electrophotographic imaging apparatus of FIG. 1.

FIG. 4 is a cross-sectional view of the fusing apparatus 200 according to another example of the present disclosure, which may be installed in the electrophotographic imaging apparatus of FIG. 1.

Referring to FIG. 4, the fusing apparatus 200 includes the endless belt 210 that is rotatable, the backup member 230 provided outside the endless belt 210 and in contact with endless belt 210 and configured to drive the endless belt 210 in the direction of the arrow F, a heat source 235 such as a halogen lamp provided inside the endless belt 210, a metal bracket 233 provided below the heat source 235, and a pressing member 220 provided between the metal bracket 233 and the endless belt 210 and configured to transmit radiant heat and pressure from the heat source 235 to the endless belt 210 and form the fusing nip 201 while facing the backup member 230. The backup member 230 may be, for example, a backup roller (i.e., a pressing roller). The backup member 230 may be arranged to be in contact with the pressing member 220 with the endless belt 210 therebetween, such that the backup member 230 and the pressing member 220 rotate while pressing against each other, thereby driving the endless belt 210.

Figure 5:
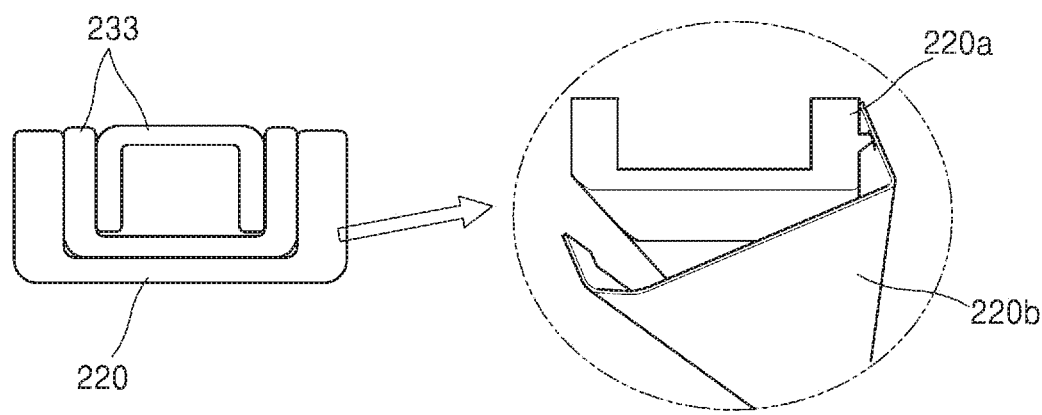
FIG. 5 is a cross-sectional view of a pressing member and a metal bracket illustrated in FIG. 4.

FIG. 5 is a cross-sectional view of the pressing member 220 and the metal bracket 233 illustrated in FIG. 4.

Referring to FIG. 5, the pressing member 220 includes an inner holder 220*a* configured to support the metal bracket 233 and a nip plate 220*b* attached to an outer surface of the inner holder 220*a*. The nip plate 220*b* may include a metal selected from stainless steel, nickel, and aluminum, for example. In particular, in some examples, the nip plate 220*b* may be a plate made of a metal selected from stainless steel, nickel, and aluminum. The inner holder 220*a* may be, for example, a structure in which a heat-resistant organic polymer is molded into a predetermined shape or form. As illustrated in FIG. 5, the inner holder 220*a* may include, for example, first and second side wall portions that are separated from each other and a base portion that connects the first side wall portion to the second side wall portion. A convex portion can protrude from an outer surface of at least one of the first and second side wall portions of the inner holder 220*a*. A concave portion may be formed at an inner surface of the nip plate 220*b* to correspond to the convex portion, and the convex portion may be inserted into the concave portion such that the nip plate 220*b* is coupled to the inner holder 220*a*.

Referring back to FIG. 4, the heat source 235 can be provided inside the endless belt 210. The backup member 230 can be provided outside the endless belt 210 such that the backup member 230 faces the pressing member 220. The pressing member 220 and the backup member 230 can press against each other with the endless belt 210 disposed therebetween. For example, a temperature sensor (not shown) and a thermostat (not shown) may be installed at an upper portion of the heat source 235. In some examples, a pressing force acting towards the metal bracket 233 and the backup member 230 may be applied by a pressing member (not shown) (e.g., a spring device) to the upper portion of the heat source 235, perpendicularly to a direction in which the endless belt 210 circulates.

As illustrated in FIG. 4, a pressing force acting towards the pressing member 220 may also be applied to the backup member 230 by a pressing member, for example, a spring 231. The backup member 230 may drive the endless belt 210. For example, the backup member 230 may be a backup roller or a pressing roller configured such that an elastic layer is formed on an outer circumferential surface of a metallic core. The backup member 230 may rotate while pressing against the pressing member 220 with the endless belt 210 disposed therebetween, thereby driving the endless belt 210. The pressing member 220 can form the fusing nip 201 along with the backup member 230, and can guide the endless belt 210 to be driven. The belt guide 240 may be further provided at an outer side of the fusing nip 201 so that the endless belt 210 can be smoothly driven. The belt guide 240 may be integrally formed with the pressing member 220, and may be a separate member from the pressing member 220.

Figure 6:
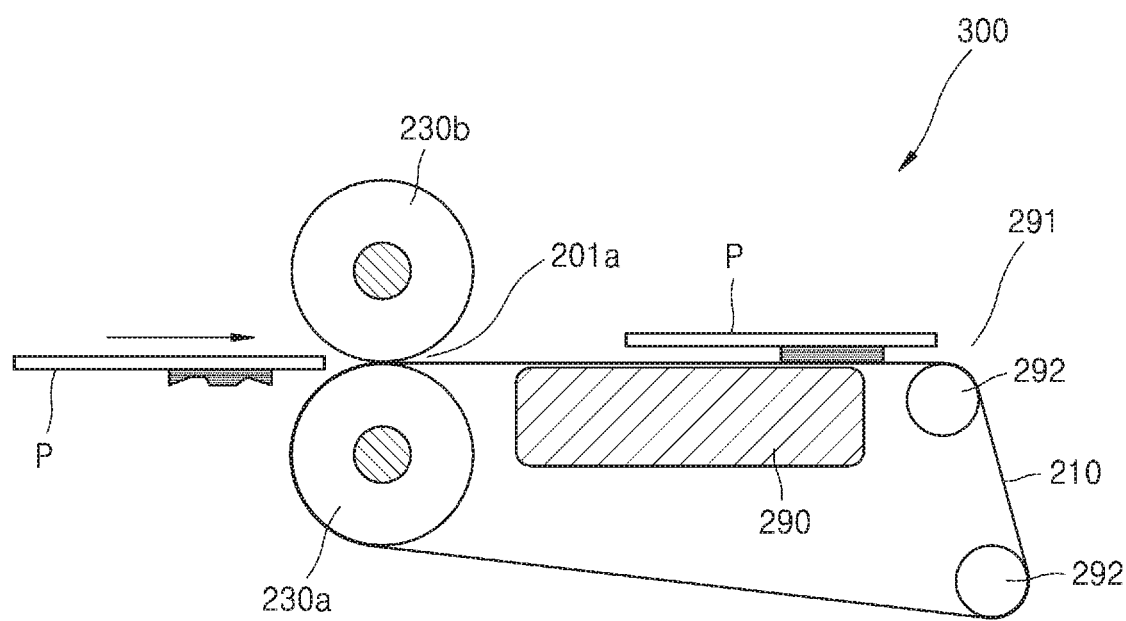
FIG. 6 is a schematic cross-sectional view of a gloss-enhancing apparatus according to an example of the present disclosure, which may be installed in the electrophotographic imaging apparatus of FIG. 1.

FIG. 6 is a schematic cross-sectional view of the gloss-enhancing apparatus 300 according to an example of the present disclosure, which may be installed in the imaging apparatus of FIG. 1. Referring to FIG. 6, the recording medium P having a toner image which has been fused by passing through a fusing apparatus, e.g., the fusing apparatus 200 of FIG. 1, may further pass through the gloss-enhancing apparatus 300 to obtain a higher-gloss and higher-quality image. In particular, when a higher-gloss and higher-quality full-color toner image with uniform gloss is desired in the fields of photography, computer graphics, etc., the gloss-enhancing apparatus 300 may be used.

The gloss-enhancing apparatus 300 can include the endless belt 210 that is rotatable, a backup roller 230*a*, a heating roller 230*b*, non-heating rollers 292, and a cooling device 290. The heating roller 230*b* can be provided outside the endless belt 210 and in contact with the endless belt 210 and can be configured to heat the endless belt 210. The backup roller 230*a* can be provided inside the endless belt 210 and in contact with the endless belt 210 and can be configured to form a nip 201*a* with the endless belt 210 disposed therebetween while facing the heating roller 230*b* and drive the endless belt 210 in a reciprocating manner. The non-heating rollers 292 can be provided inside the endless belt 210 at a distance spaced apart from the backup roller 230*a*. The endless belt 210 can be configured to drive in a reciprocating manner while forming a closed curve with the backup roller 230*a* and two non-heating rollers 292. The cooling device 290 can be provided inside the endless belt 210 between the backup roller 230*a* and one of the two non-heating rollers 292 and can be configured to cool the endless belt 210 that has passed through the nip 201*a*.

The recording medium P having the toner image that has been fused thereon can pass through the nip 201*a* consisting of the heating roller 230*b* and the backup roller 230*a*. In some examples, the endless belt 210 heated by the heating roller 230b heats the fused toner image. The backup roller 230a may or may not heat the endless belt 210. The cooling device 290 can be configured to cool the toner image of the recording medium P positioned on the surface of the endless belt 210 by cooling the endless belt 210 that has passed through the nip 201a. The cooling device 290 may be a heat sink made of a metal material, such as aluminum or copper, having high thermal conductivity. The recording medium P transported as being loaded on the surface of the endless belt 210 can be separated from the endless belt 210 by the non-heating rollers 292. The fused toner image in contact with the surface of the endless belt 210 can be heated, and then, cooled, resulting in a higher-quality image having high gloss similar to the high gloss of a release layer 213 on the surface of the endless belt 210. As such, the high gloss of the release layer 213 (see FIGS. 9A and 9B) on the surface of the endless belt 210 may be a factor in forming a higher-quality image. For example, in order to obtain a higher-gloss toner image, after cooling, the toner image that has passed through the heating section can be separated, in a state where the toner image is approximately uniformly in contact with the endless belt 210. As described above, the gloss-enhancing apparatus 300 may be able to make the fused toner image higher gloss and higher quality through heating, cooling, and separation processes, in some examples.

Figure 7:
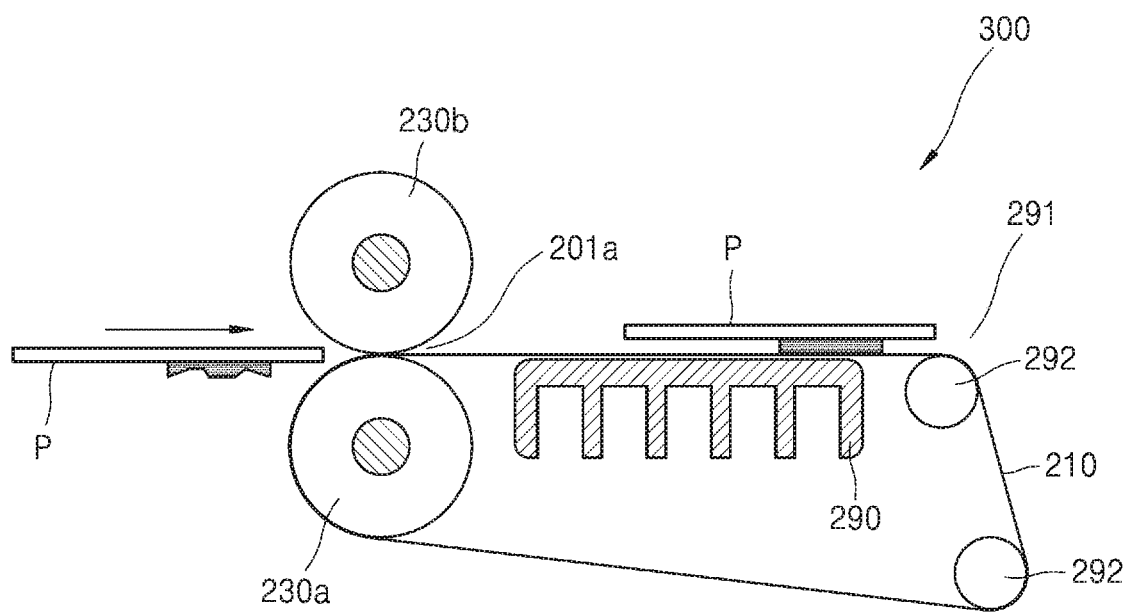
FIG. 7 is a schematic cross-sectional view of a gloss-enhancing apparatus according to another example of the present disclosure, which may be installed in the electrophotographic imaging apparatus of FIG. 1.

FIG. 7 is a schematic cross-sectional view of the gloss-enhancing apparatus 300 according to another example of the present disclosure, which may be installed in the imaging apparatus of FIG. 1. The gloss-enhancing apparatus 300 according to an example of the present disclosure may be the same as that of FIG. 6. Thus, each component of the gloss-enhancing apparatus 300 of FIG. 7 is given the same reference numbers as the corresponding component of the gloss-enhancing apparatus 300 of FIG. 6. The cooling device 290 of the present example may be the same as the one included in the gloss-enhancing apparatus 300 of FIG. 6 in that the cooling device 290 in both FIGS. 6 and 7 can be a contact-type in contact with the endless belt 210. However, the cooling device 290 of the present example may be different in that it has a cooling fin structure for widening a cooling area on a rear surface to enhance the cooling effect. That is, except that the cooling device 290 may be a heat sink having a cooling fin structure on a rear surface and made of a metal material, such aluminum or copper, having high thermal conductivity, the gloss-enhancing apparatus 300 of the present example has a structure and an operation mechanism that may be the same as the gloss-enhancing apparatus 300 of FIG. 6.

Figure 8:
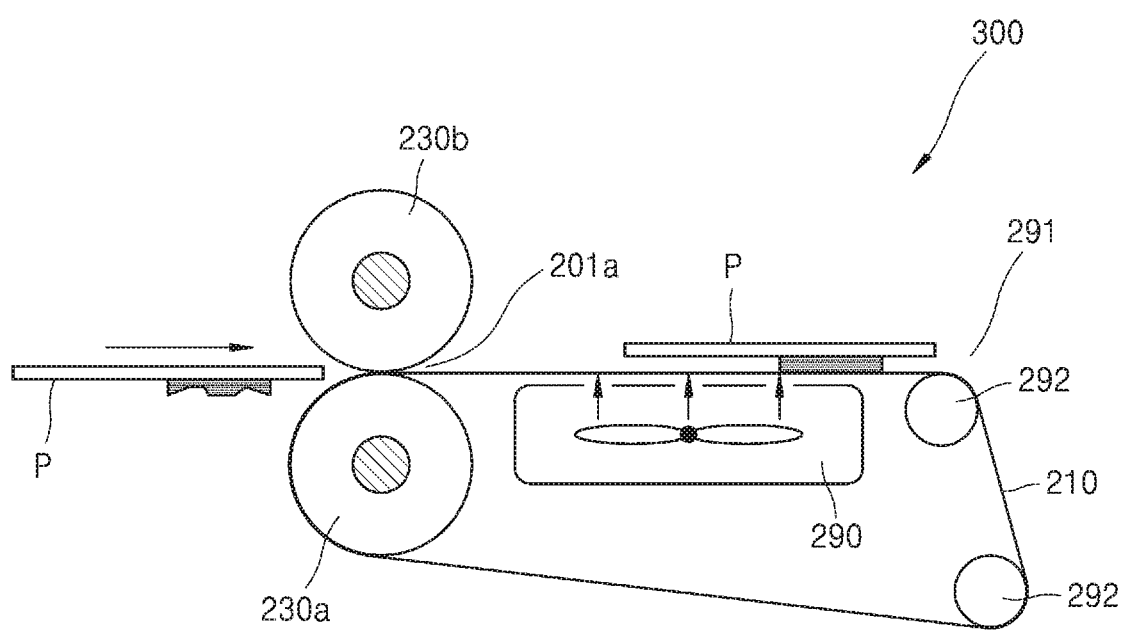
FIG. 8 is a schematic cross-sectional view of a gloss-enhancing apparatus according to another example of the present disclosure, which may be installed in the electrophotographic imaging apparatus of FIG. 1.

FIG. 8 is a schematic cross-sectional view of the gloss-enhancing apparatus 300 according to another example of the present disclosure, which may be installed in the imaging apparatus of FIG. 1 The gloss-enhancing apparatus 300 of the present example may be the same as that of FIGS. 6 and 7. However, the cooling device 290 of the present example can be a non-contact type heat sink that does not contact the endless belt 210. For example, a fan that blows cold wind can be installed at one location of the heat sink to release heat accumulated in the heat sink to the outside. In such a non-cooling method of the present example, the cooling device 290 does not contact the endless belt 210 so that the cooling device 290 does not wear down the inner side of the endless belt 210, and accordingly, does not affect the driving of the endless belt 210.

Figure 9A:
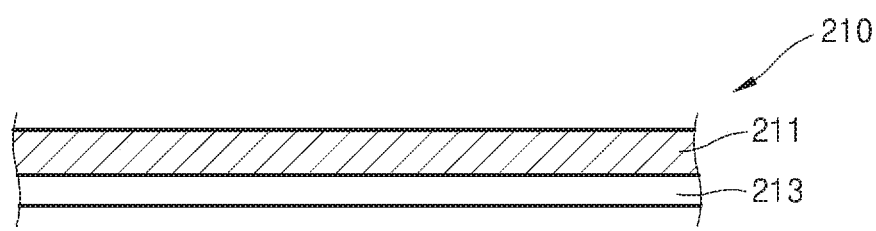
FIGS. 9A and 9B are schematic cross-sectional views of a belt according to two examples of the present disclosure, which can be used as an endless belt in the fusing apparatuses illustrated in FIGS. 2 to 4 or the gloss-enhancing apparatuses illustrated in FIGS. 6 to 8.

FIG. 9A is a schematic cross-sectional view of the endless belt 210 according to an example of the present disclosure, which can be used in the fusing apparatuses illustrated in FIGS. 2 to 4 or the gloss-enhancing apparatus 300 illustrated in FIGS. 6 to 8.

Referring to FIG. 9A, the endless belt 210 may include a substrate layer 211 in the form of a film. An adhesive layer (not shown) may be formed between the substrate layer 211 and the release layer 213. The substrate layer 211 may have a structure including a first base resin and a first thermally conductive filler dispersed in the first base resin. The first base resin may be at least one polymer having desired heat resistance and abrasion resistance selected from polyimides (PIs), polyamides (PAs), and polyamideimides (PAIs). The first base resin may be one selected from these polymers or a blend of two or more of these polymers. These polymers may have abrasion resistance and heat resistance that enables these polymers to endure a fusing temperature of, for example, about 120° C. to about 200° C. The first thermally conductive filler may be at least one selected from carbon black, graphite, boron nitride (BN), carbon nanotubes (CNTs), and carbon fibers. The first thermally conductive filler may have a particle shape or a fibrous shape and may have a large aspect ratio to increase thermal conductivity. For example, the first thermally conductive filler may include carbon fibers having an average length of about 6 μm or more in an amount of about 30 parts by weight to about 50 parts by weight with respect to 100 parts by weight of the first base resin. To improve bending resistance of the substrate layer 211, the amount of the first thermally conductive filler may be adjusted to about 40 parts by weight or less.

The first thermally conductive filler may include carbon fibers having an average length of about 7 μm or more in an amount of about 30 parts by weight to about 50 parts by weight based on 100 parts by weight of the first base resin. The first thermally conductive filler may include carbon fibers having an average length of about 8 μm or more in an amount of 30 parts by weight to about 50 parts by weight with respect to 100 parts by weight of the first base resin. An upper limit of the average length of the carbon fibers may not be particularly limited but may vary depending on commercial availability. The upper limit of the average length of the carbon fibers may be, for example, about 100 μm or less, for example, about 50 μm or less, about 40 μm or less, about 30 μm or less, about 20 μm or less, about 15 μm or less, about 14 μm or less, about 13 μm or less, about 12 μm or less, about 11 μm or less, or about 10 μm or less. By adjusting the amount and average length of the first thermally conductive filler within the above-described ranges, the substrate layer 211 may have a thermal conductivity in a thickness direction of about 1.5 W/m·K or more, for example, about 1.8 W/m·K or more. The carbon fibers may be, for example, vapor grown carbon fibers (VGCFs).

The thickness of the substrate layer 211 may be selected to have flexibility and elasticity sufficient to enable the endless belt 210 to be flexibly deformed in the fusing nip 201 and to be restored to its original state after escaping from the fusing nip 210. For example, the substrate layer 211 may have a thickness of about 30 μm to about 200 μm, for example, about 75 μm to about 100 μm or about 50 μm to about 100 μm.

When the first base resin of the substrate layer 211 is a polyimide, the substrate layer 211 may be formed using, for example, the following method. First, a dianhydride compound and a diamine compound are allowed to react to obtain a polyamic acid. Non-limiting examples of suitable dianhydride compounds include pyromellitic dianhydride (PMDA), 3,3',4,4'-biphenyltetracarboxylic dianhydride, 4,4'-hexafluoroisopropylidene bis(phthalic anhydride), 4,4', 5,5'-sulfonyldiphthalic anhydride, 3,3',4,4'-benzophenonetetracarboxylic dianhydride, and 3,3',4,4'-oxydiphthalic anhydride. Non-limiting examples of suitable diamine compounds include p-phenylene diamine (p-PDA), m-phenylene diamine, 4,4'-oxydianiline (ODA), 4,4'-methylene diamine, and 4,4'-diaminodiphenyl sulfone. The polyamic acid may be obtained by a reaction between the dianhydride compound and the diamine compound in a stoichiometric ratio of about 0.9 to 1:about 0.9 to 1 at a relatively low temperature, for example, at room temperature. The reaction may be carried out in dipolar aprotic amide solvents such as dimethyl acetamide (DMAc) and N-methyl-2-pyrrolidone (NMP).

In some examples, the substrate layer 211 may consist of polyimides only, and in order to increase the thermal conductivity, a thermally conductive filler may be added to the polyimides so as to increase the thermal conductivity of the substrate layer 211. In order to increase the thermal conductivity, a first thermally conductive filler such as carbon fiber is dispersed in the polyamic acid by roll milling to obtain a dispersion. The quantitative relationship between both materials may be adjusted within the above-described ranges. Examples of a dispersion method include, but are not limited to, rotation milling in which milling is performed by placing a target to be dispersed in a container along with milling beads and rotating the target using a dispersion rotor, and roll milling (e.g., three-roll milling in which a target to be dispersed is milled using three rolls) (i.e., a feed roll, a center roll, and an apron roll, that rotate while being engaged with one another). When the rotation milling method is used, a rotational force applied to the milling beads may be too strong, so that the length of the first thermally conductive filler may be shortened. In this case, it may adversely affect the formation of a thermally conductive path or a thermally conductive network in the substrate layer 211. In this case, it may be disadvantageous to increase the thermal conductivity of the substrate layer 211 as much as desired. When the three-roll milling method is used, a physical force applied to the first thermally conductive filler may be reduced (i.e., minimized), thereby reducing (i.e., minimizing) the shortening of the length thereof, and thus the thermal conductivity of the substrate layer 211 may be enhanced.

Subsequently, the resulting dispersion may be formed into a film, and the film may be heated at a temperature ranging from about 300° C. to about 380° C., for example, about 320° C. to about 370° C., about 330° C. to about 360° C., about 340° C. to about 355° C., or about 340° C. to about 350° C. to cause a cyclization reaction by imidization, thereby obtaining the substrate layer 211 formed of a polyimide.

When the substrate layer 211 formed of a polyimide and including the first thermally conductive filler is used, improved bending resistance and improved crack resistance may be obtained, the lifespan of the fusing belt may be increased, and a thermally conductive path or network may be efficiently formed by the first thermally conductive fillers, thus achieving desired higher thermal conductivity.

In a fusing belt using a halogen lamp as a heat source, a film layer formed of at least one metal selected from stainless steel, nickel, and aluminum may be generally used as the substrate layer 211.

The outermost layer of the endless belt 210 may be the release layer 213. When toner on the recording medium P is melted, an offset phenomenon, in which the toner is attached to the endless belt 210, may occur. The offset phenomenon may cause a printing failure such that a portion of a printed image on the recording medium P is missed, and a jam may be caused in which the recording medium P that has escaped from the fusing nip 201 is not separated from the endless belt 210 and is attached to an outer surface of the endless belt 210. In addition, when the abrasion resistance of the release layer 213 is not large enough, due to abrasion as the use time of the endless belt 210 elapses, the surface gloss of the endless belt 210 may be degraded. Accordingly, In this regard, the gloss of the fused toner image may be also degraded.

In this regard, to prevent or reduce the offset phenomenon and the gloss reduction of fused toner image, the release layer 213 can be formed to include a coating layer including an inorganic-organic nanocomposite material in which inorganic nanoparticles are dispersed in a siloxane polymer matrix. In order to improve abrasion resistance, durability of the abrasion resistance, and releasability, the nanocomposite material may be an inorganic-organic nanocomposite material in which an inorganic nanoparticle having higher hardness is covalently connected to a siloxane polymer having increased releasability. An average particle diameter of the inorganic nanoparticle may be adjusted small in a range of about 20 nm to about 200 nm, for example, about 20 nm to about 150 nm, about 20 nm to about 100 nm, about 20 nm to less than about 100, or about 20 nm to about 90 nm. In an example, the inorganic nanoparticle may be a silica nanoparticle or a glass nanoparticle. The silica nanoparticle may be, for example, obtained by hydrolysis of a silicone alkoxide, such as tetraethoxysilane (TEOS), in sol-gel synthesis, or may be commercially available. The siloxane polymer may be a product which is formed by a dehydration-condensation reaction by an organosilanol compound represented by Formula 1 and having two or more hydroxyl groups, and which has repeated Si—O—Si linkages. By carrying out the dehydration-condensation reaction in the presence of the silica nanoparticle or the glass nanoparticle having a hydroxyl group (—OH) included therein, the silica nanoparticle and the siloxane polymer may be connected to each other via an ether bond —O—.

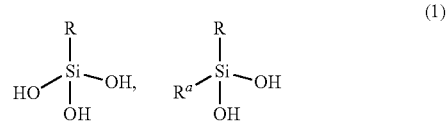

(1)

Here, $R^a$ may be a $C_1$-$C_5$ alkyl group, such as a $C_1$-$C_3$ alkyl group, or a $C_1$-$C_5$ alkoxy group, such as a $C_1$-$C_3$ alkoxy group; and R may be a monovalent organic group represented by —$(CR_1R_2)$n-$C(R_3)_3$, wherein $R_1$, $R_2$, and $R_3$ may each independently be —H or —F, and n may be an integer from 0 to 20, for example, 0 to 15, 0 to 1, 0 to 8, or 0 to 5. Non-examples of the organosilanol compound represented by Formula 1 may be any one of the following groups represented by Formula 2, but are not limited thereto.

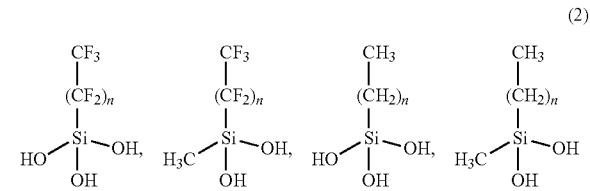

(2)

Here, n may be an integer from 0 to 20, for example, 0 to 15, 0 to 10, 0 to 8, or 0 to 5, as defined in Formula 1.

The organosilanol compound represented by Formula 1 may be obtained by hydrolyzing an organosilane compound represented by Formula 3 below:

(3)

In Formula 3, $X_1$, $X_2$, and $X_3$ may each independently be: a $C_1$-$C_5$ alkyl group, such as a $C_1$-$C_3$ alkyl group; a $C_1$-$C_5$ alkoxy group, such as a $C_2$-$C_3$ alkoxy group; or a chloro, and R is the same as defined in Formula 1.

A non-limiting example of the organosilane represented by Formula 3 may be, but is not limited thereto, one of the following compounds represented by Formula 4:

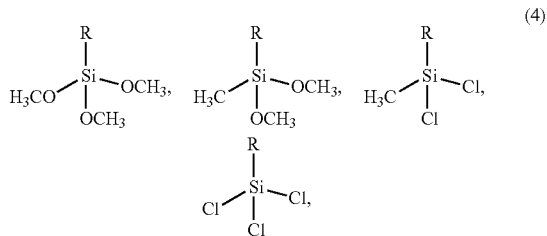

(4)

In Formula 4, R is the same as defined in Formula 1.

A further non-limiting example of the organosilane compound represented by 3 may be, but is not limited thereto, one of the following compounds represented by Formula 5:

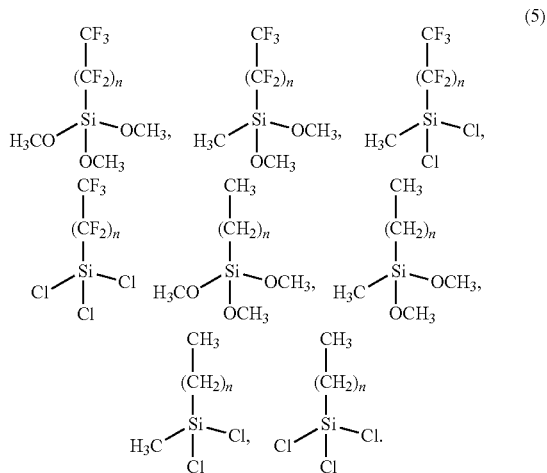

(5)

In Formula 5, n is the same as defined in Formula 1. In the organosilane compound, an alkoxy group, such as a methoxy group, and chloro may be converted into hydroxyl groups, for example, in the compounds represented by Formula 2 by hydrolysis.

As described above, R in the organosilane compound represented by Formula 3 is a monovalent organic group represented by —$(CR_1R_2)n$-$C(R_3)_3$, and to increase the releasability of the coating layer including the siloxane polymer formed by condensation polymerization of the organosilane compound represented by Formula 1, which is a hydrolysis product of the organosilane compound represented by Formula 3, $R_1$, $R_2$, and $R_3$ may each be a substituent including a fluorine atom. To increase the releasability of the coating layer, $R_1$, $R_2$, and $R_3$ may be selected to be fluorine atoms.

When the release layer 213 includes the coating layer including the inorganic-organic nanocomposite material, improved abrasion resistance and releasability may be obtained while maintaining the gloss of the surface of the substrate layer 211 such as the polyimide substrate layer 211. Since the inorganic nanoparticle has a higher hardness and a smaller particle diameter, such properties can contribute to improving the abrasion resistance and the gloss of the belt surface, and the siloxane polymer having the above-described chemical structure can also contribute to improving the releasability of the belt. That is, the release layer 213 may include the inorganic-organic nanocomposite material in which the siloxane polymer having improved releasability is composited on the surface of the inorganic nanoparticle having higher hardness. Accordingly, the release layer 213 may exhibit a ceramic characteristic, and thus higher surface hardness, thereby having improved abrasion resistance. In this regard, the gloss reduction of the belt surface may be prevented or reduced for an increased period of time. Since the surface gloss of the belt influences the image quality, use of the belt including the release layer 213 may lead to a more stable formation of a toner image with improved gloss for a long period of time in the fusing process and the glossing process.

The release layer 213 including the coating layer including the inorganic-organic nanocomposite material may be better in abrasion resistance and durability for a longer period of time as compared to a release layer including a fluorine-based resin coating layer, which may be used as a release layer in the other approached used for an endless belt for fusing a toner image or improving gloss of a toner image. In this regard, the presence of release layer 213 can result in a more stable formation of high-gloss and high-quality toner images.

That is, the release layer in other approached may be formed by applying a coating layer using a fluorine-based resin, such as a copolymer of tetrafluoroethylene and perfluoroether, which is also referred to as perfluoroalkoxy (PFA); polytetrafluoroethylene (PTFE); or a copolymer of tetrafluoroethylene and hexafluoropropylene, which is also referred to as fluorinated ethylene propylene (FEP). However, in the case of PFA which is most used as a material for forming the release layer among fluorinated resins, a coating solution of PFA may be present in the form of PFA powder dispersed in a solvent. Here, the size of the PFA powder may be large in a range of about 0.1 μm to about 2 μm so that, even if such a PFA release layer is coated on the polyimide substrate layer, the surface gloss of the resulting release layer may fail to implement the surface gloss of 80 GU or more. In addition, considering that a film formed of a fluorinated resin may have a smaller surface hardness, a belt employing the film as a release layer may wear off the surface as the period of use has elapsed so that the surface gloss may easily be degraded. In addition, to form the release layer using a fluorinated resin coating, an adhesive layer may be formed between the substrate layer and the release layer. However, due to high viscosity of the adhesive layer, the presence of the adhesive layer may increase the surface roughness, which may cause a decrease in the gloss of the belt surface.

In contrast, the inorganic-organic nanocomposite material is a composite of an inorganic nanoceramic particle having higher hardness and improved abrasion resistance and an organic material having higher releasability characteristics, wherein these materials are selected to improve the abrasion resistance of the belt surface. For example, the inorganic-organic nanocomposite material may be prepared by interconnecting an inorganic nanoceramic particle having higher hardness and an organic material having higher releasability characteristics via covalent bonds. Therefore, the release layer 213 including the coating layer including the inorganic-organic nanocomposite material has improved surface gloss, abrasion resistance, releasability, and durability, as compared to the release layer including a fluorinated resin coating, and thus, may aid in the stable formation of a high-gloss and high-quality toner image for a long period of time.

The release layer 213 having the characteristics described above may be formed by coating and heat-treating processes. For example, an inorganic-organic nanocomposite material is prepared and then dispersed in water or an organic solvent, thereby obtaining a dispersion. A coating layer may be formed on the substrate layer 211 by using the dispersion according to a coating method, such as spray coating, dip coating, or ring coating. The coating layer may be heat-treated in air or in an inert atmosphere such as nitrogen gas, thereby forming the release layer 213 including the coating layer including the inorganic-organic nanocomposite material. The heat treatment may be carried out at a temperature in a range of about 100° C. to about 300° C., for example, about 150° C. to about 200° C., for about 5 minutes to about 1 hour, for example, about 5 minutes to 30 minutes or about 5 minutes to about 20 minutes.

An adhesive layer may exist between the substrate layer 211 and the release layer 213 including the nanoceramic composite material. However, in an example where a covalent bond is formed due to a radical reaction formed during a heat treatment process between the nanoceramic composite material in the release layer 213 and the substrate layer 211, an adhesive layer may be omitted when adhesion between the two layers is at a desired level. The release layer 213 may be also formed by preparing an inorganic-organic nanocomposite material coating in the form of a tube and adhering the coating onto the substrate layer 211 by intervening an adhesive layer.

Since the release layer 213 includes the coating layer including the inorganic-organic nanocomposite material having ceramic characteristics, the thickness of the release layer 213 may be reduced. For example, the thickness of the release layer 213 may be as thin as about 2 μm to about 30 μm, for example, about 2 μm to about 10 μm or about 3 μm to about 5 μm. Thus, the endless belt 210 may have improved thermal efficiency.

Figure 10:
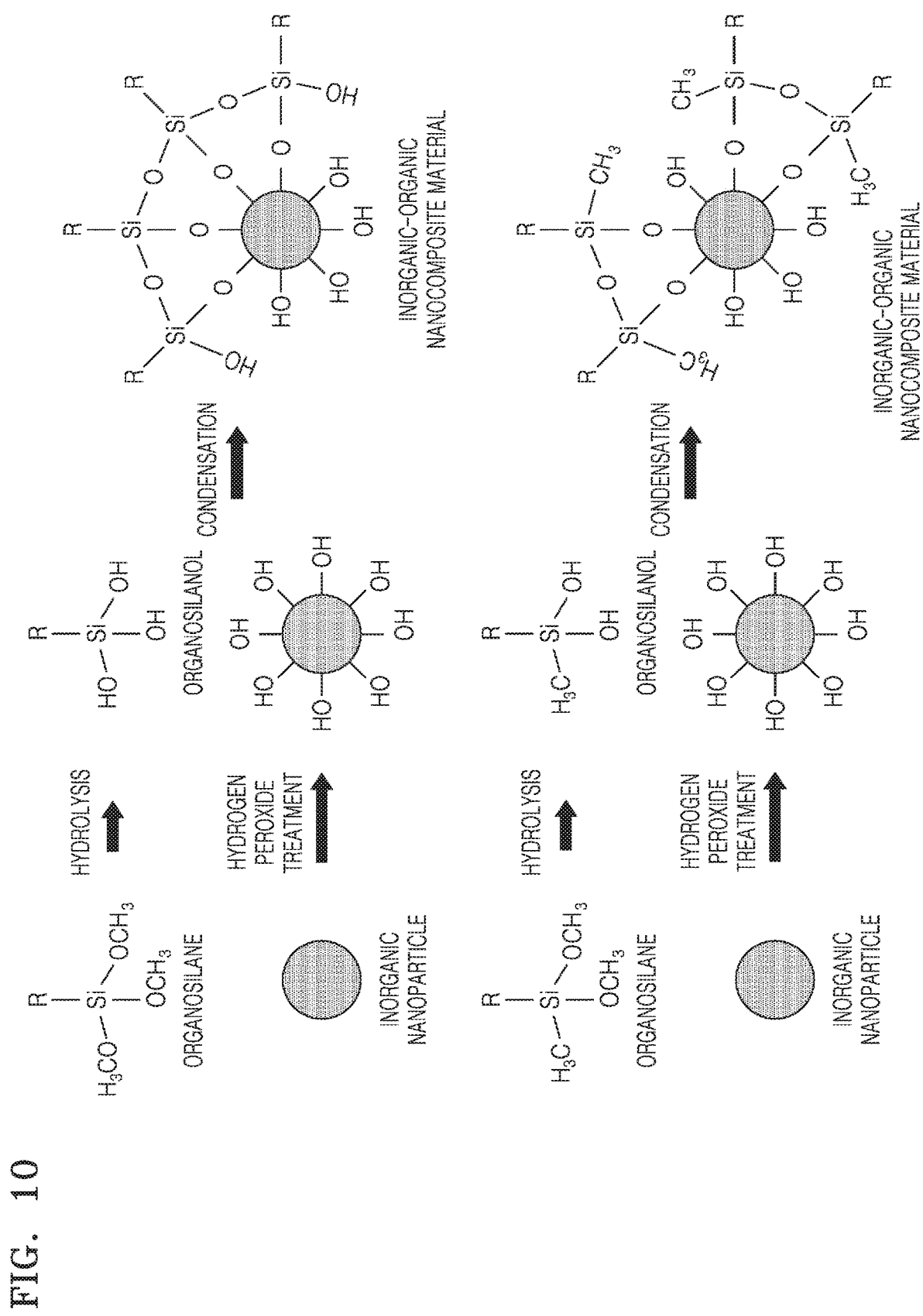
FIG. 10 schematically illustrates a process of forming a release layer including a coating layer including an inorganic-organic nanocomposite material by performing a dehydration-condensation reaction of an organosilanol compound in the presence of inorganic nanoparticles.

FIG. 10 schematically illustrates a process of forming the release layer 213 including the coating layer including the inorganic-organic nanocomposite material by performing a dehydration-condensation reaction of the organosilanol compound in the presence of inorganic nanoparticles such as silica nanoparticles or glass nanoparticles. Referring to FIG. 10, an organosilane compound having the above-described chemical structure can be hydrolyzed to form an organosilanol compound. In FIG. 10, a moiety represented by R may be a monovalent organic group represented by —$(CR_1R_2)$ n-$C(R_3)_3$ as described above. A hydroxyl group (—OH) may be introduced to the surface of the inorganic nanoparticle. For example, a hydroxyl group may be introduced by treating the surface of the silica nanoparticle or glass nanoparticle with hydrogen peroxide or by irradiating the same surface by ultraviolet (UV) rays in vacuum. In the presence of the inorganic nanoparticle to which the hydroxyl group is introduced, a dehydration-condensation reaction occurring between hydroxyl groups of the organosilanol molecules may be performed. Accordingly, a siloxane polymer network is formed, and at the same time, a dehydration-condensation reaction also occurs between hydroxyl groups of the inorganic nanoparticle and the hydroxyl groups of the organosilanol compound. In this regard, the inorganic nanoparticle and the siloxane polymer may be connected to each other via a Si—O—Si siloxane network. By such a reaction, the siloxane polymer network capable of imparting excellent releasability and the surface of the inorganic nanoceramic particles may be covalently linked. Accordingly, the release layer 213 may include the coating layer including the inorganic-organic nanocomposite material. In an example, the release layer 213 may consist of the coating layer including the inorganic-organic nanocomposite material. A methyl group remaining on the nanocomposite material may be used to react with the polyimide molecules of the substrate layer 211 so that the substrate layer 211 and the release layer 213 may be connected to each other via a covalent bond.

Figure 9B:
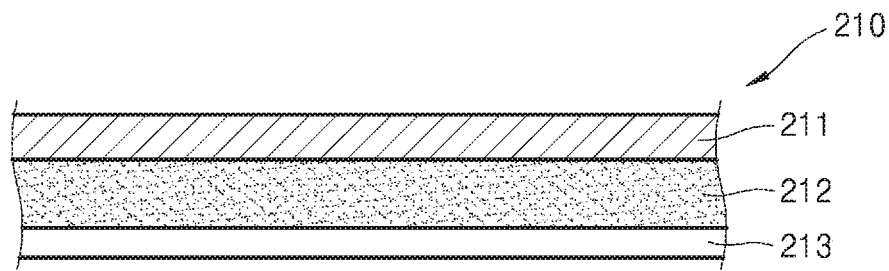

FIG. 9B is a schematic cross-sectional view of the endless belt 210 according to another example of the present disclosure, which can be used in the fusing apparatus illustrated in FIGS. 2 to 4 or the gloss-enhancing apparatus 300 illustrated in FIGS. 6 to 8.

Referring to FIG. 9B, the endless belt 210 of FIG. 9B differs from the endless belt 210 of FIG. 9A in that it further includes the elastic layer 212 between the substrate layer 211 and the release layer 213. Therefore, the description of the endless belt 210 of FIG. 9A can be applied to the substrate layer 211 and the release layer 213 of the endless belt 210 of FIG. 9B In the present example, an adhesive layer (not shown) may or may not be disposed between the substrate layer 211 and the elastic layer 212 and/or between the release layer 213 and the elastic layer 212 of the endless belt 211. The elastic layer 212 facilitates formation of the fusing nip 201 that is relatively wide and flat. When a belt including the elastic layer 212 is used, the image quality of a printed material may be enhanced. Thus, the belt including the elastic layer 212 may be used in imaging apparatuses for color image formation. The elastic layer 212 may be formed of a heat-resistant material that is able to endure a fusing temperature. The elastic layer 212 may include a second base resin and a second thermally conductive filler dispersed in the second base resin. The second base resin may include at least one elastic resin selected from a fluorine-containing rubber, a silicone rubber, natural rubber, isoprene rubber, butadiene rubber, nitrile rubber, chloroprene rubber, butyl rubber, an acrylic rubber, a hydrin rubber, a urethane rubber, a polystyrene-based resin, a polyolefin resin, a polyvinyl chloride-based resin, a polyurethane resin, a polyester resin, a polyamide resin, a polybutadiene-based resin, trans-polyisoprene-based resin, and a chlorinated polyethylene-based resin. The elastic resin may be an elastic rubber or a thermoplastic elastomer having thermal resistance that is able to endure a temperature of, for example, about 120° C. to about 200° C. and abrasion resistance. The second base resin may be any one of the above-listed elastic resins, or a blend of two or more of these elastic resins.

The elastic layer 212 may include a second thermally conductive filler dispersed in the second base resin. The second thermally conductive filler may be at least one selected from silicon carbide (SiC), silicon nitride ($Si_3N_4$), boron nitride (BN), aluminum nitride (AlN), alumina ($Al_2O_3$), zinc oxide (ZnO), magnesium oxide (MgO), silica ($SiO_2$), copper (Cu), aluminum (Al), silver (Ag), iron (Fe), nickel (Ni), carbon black, graphite, carbon nanotubes (CNTs), and carbon fibers. The second thermally conductive filler may have a particle shape or a fibrous shape and may have a large aspect ratio to increase thermal conductivity. For example, in terms of bending resistance and thermal conductivity, the second thermally conductive filler may include about 60 parts by weight to about 70 parts by weight of SiC, about 0 parts by weight to about 10 parts by weight of BN, and about 0.5 parts by weight to about 5 parts by weight, for example, about 2 parts by weight to about 4 parts by weight or about 2 parts by weight to about 3 parts by weight of carbon fibers having an average length of about 6 μm or more, with respect to 100 parts by weight of the second base resin. The second thermally conductive filler may include carbon fibers having an average length of about 7 μm or more in an amount of about 0.5 parts by weight to about 5 parts by weight, for example, about 2 parts by weight to about 4 parts by weight or about 2 parts by weight to about 3 parts by weight, with respect to 100 parts by weight of the second base resin. To increase the thermal conductivity of the elastic layer 212, an increased amount of the second thermally conductive filler needs to be mixed. However, when the amount of the second thermally conductive filler is increased, adhesion between the substrate layer 211 and the elastic layer 212 and adhesion between the elastic layer 212 and the release layer 213 may be reduced, or the binding strength of the elastic layer 212 itself becomes weaker, thus tending to reduce the lifespan of the endless belt.

The thickness of the elastic layer 212 may be selected to have flexibility and elasticity sufficient to enable the endless belt 210 to be flexibly deformed in the fusing nip 201 or the nip 201a (in FIGS. 6 to 8) and to be restored to its original state after escaping from the fusing nip 210 or the nip 201a. For example, the thickness of the elastic layer 212 may range from, for example, about 10 μm to about 300 μm, for example, about 50 μm to about 250 μm, about 70 μm to about 200 μm, about 60 μm to about 150 μm, about 70 μm to about 130 μm, or about 80 μm to about 120 μm in consideration of heat transfer to the recording medium P.

As described above, the endless belt that can be used in the fusing apparatus and the gloss-enhancing apparatus includes the release layer including the coating layer including the inorganic-organic nanocomposite material in which the inorganic nanoparticles are dispersed in the siloxane polymer matrix, the endless belt may have high surface glass, excellent abrasion resistance, and excellent releasability. In addition, the abrasion of the belt surface may be effectively prevented or at least reduced, and the gloss of the belt surface may be highly maintained for a long period of time. In this regard, when the endless belt is used for fusing a toner image or improving gloss of a toner image, the high-gloss and high-quality image may be stably obtained for a long period of time. In addition, since the release layer including the coating layer including the inorganic-organic nanocomposite material having ceramic characteristics is used, the thickness of the release layer may be reduced. Therefore, use of the endless belt may result in improved thermal efficiency.

Hereinafter, the present disclosure will be described in further detail with reference to the following comparative examples and examples. However, these examples are provided for illustrative purposes only and are not intended to limit the scope of the present disclosure.

The gloss evaluation of the examples was carried out by measuring the 75° gloss of a belt and an image by using a gloss meter (model name: GlossMate and GlossMaster) manufactured by Quality Image Products Company.

Comparative Example 1

An NMP solution (solid concentration: about 70 wt %) of polyimide precursors was prepared such that mixing amounts of pyromellitic dianhydride (PMDA), p-phenylene diamine (p-PDA), and 4,4'-oxydianiline (ODA) were adjusted to about 1:0.5:0.5 (PMDA: p-PDA: ODA) on a molar ratio basis. The precursor solution was allowed to react at room temperature while being stirred, and then, filtered, thereby obtaining a polyamic acid polymer. The polyamic acid was uniformly coated onto a tube-type mold to a thickness of about 50 μm to about 100 μm, followed by heat treatment at a temperature of about 300° C. for about 2 hours to 3 hours to cause an imidization reaction, to thereby obtain a polyimide (PI) substrate layer in the shape of an endless belt having a diameter of about 80 cm to about 120 cm.

Then, a 60% of aqueous dispersion (PFA) (manufacturer: Dupont, product name: DuPont™ Teflon® PFA TE-7224) of a copolymer of tetrafluoroethylene and perfluoroether was prepared. The PFA dispersion was spray-coated on the surface of the PI substrate layer, followed by curing at a temperature of about 300° C. Accordingly, an endless belt in which the PFA coating layer having a thickness of about 30 μm was formed on the surface of the PI substrate layer was prepared.

The endless belt was mounted as the endless belt 210 of the gloss-enhancing apparatus 300 using the non-contact cooling method as shown in FIG. 8. A pattern in which a coverage 100% solid black image and a blank having no image are present side by side was continuously printed on a conventional A4 paper by using a printer. Here, based on the center line along the longitudinal direction of the A4 paper, the coverage 100% solid black image is printed only on one side area, whereas no image is printed on the other side area of the A4 paper (blank). Here, the printing speed of the printer was about 30 mm/sec, and the pressing force of the gloss-enhancing apparatus 300 is about 40 kgf. In addition, the temperature of the gloss-enhancing apparatus 300 is controlled to about 150° C.

Figure 11:
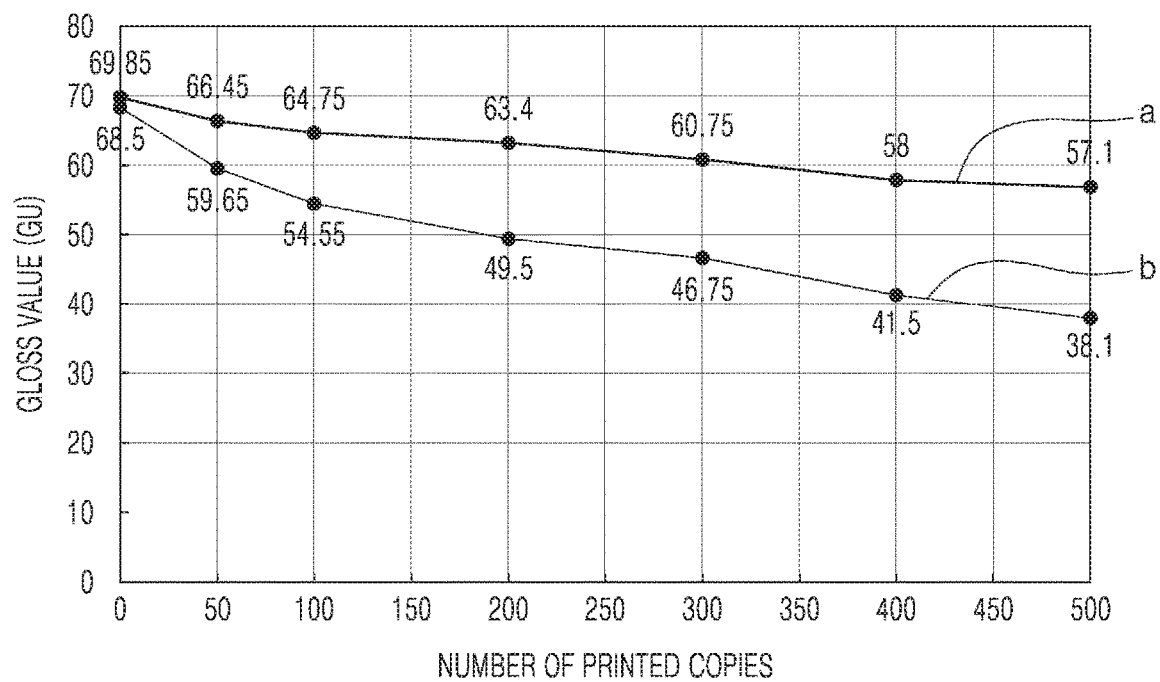
FIG. 11 is a graph showing the results of measuring changes in the gloss of the surface of the endless belt as the number of printed copies increases.

FIG. 11 is a graph showing the results of measuring changes in the gloss of the surface of the endless belt as the number of printed copies increases. In FIG. 11, the curve indicated by "a" shows the changes in the gloss of the surface of the endless belt corresponding to the area where the coverage 100% solid black image is printed, and the curve indicated by "b" shows the changes in the gloss of the surface of the endless belt corresponding to the blank area (non-image area).

Referring to FIG. 11, it was confirmed that the gloss of the belt surface decreased as the number of printed copies increases. Specifically, it was confirmed that the gloss of the belt surface corresponding to the non-image area (curve b) was degraded more than the gloss of the belt surface corresponding to the image area (curve a). In particular, in the case of the gloss-enhancing apparatus, it is important that the gloss value of the belt surface is at least 60 glass units (GU) because the gloss of the belt surface has a great influence on the gloss of the printed image. However, regarding the belt of Comparative Example 1 in which PFA was coated as the release layer, the gloss value of the belt surface fell below 60 GU before printing 100 copies in the case of the belt surface corresponding to the non-image area and printing 400 copies in the case of the belt surface corresponding to the image area. Such an occurrence can lead to a shortened lifespan of the gloss-enhancing apparatus. The phenomenon that the gloss of the belt surface corresponding to the non-image area (curve a) is degraded faster may be considered to be due to the abrasion of the belt surface more by friction with hard inorganic particles such as calcium carbonate incorporated on the surface of the recording medium (i.e., A4 paper).

Next, the changes in the gloss of the toner image printed by using the printer equipped with the gloss-enhancing apparatus were measured with the increased number of printed copies.

In the measurement of the gloss changes of the toner image, the endless belt equipped to the gloss-enhancing apparatus was a belt used for a test for printing 500 copies of the pattern in which a coverage 100% solid black image and a blank having no image are present side by side. This belt was used to print and evaluate the coverage 100% solid black on A4 paper.

Figure 12:
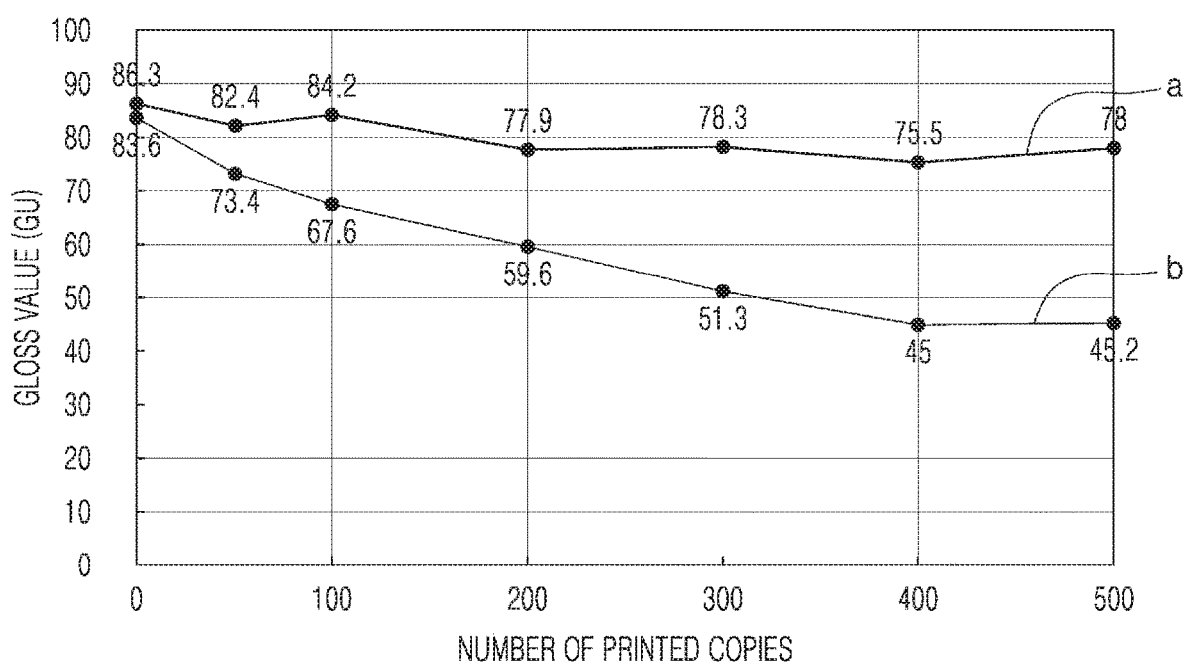
FIG. 12 is a graph showing the results of measuring changes in the gloss of the obtained toner image as the number of printed copies increases.

FIG. 12 is a graph showing the results of measuring changes in the gloss of the toner image obtained as the number of printed copies increases. In FIG. 12, the curve indicated by "a" is a gloss change curve of a toner image printed at the belt portion (i.e., an image area belt portion) through which A4 paper portion with an image area printed thereon was passed, and the curve indicated by "b" is a gloss of a toner image printed at the belt portion (i.e., a non-image area belt portion) through which A4 paper portion with a non-image area printed thereon was passed.

Referring to FIG. 12, it was confirmed that the gloss of the toner image was also degraded as the number of the printed copies increased, as in the case of the gloss of the belt surface. Specifically, it was confirmed that the gloss value (of curve b) of the toner image printed at the non-image area belt portion was significantly degraded compared to the gloss value (of curve a) of the toner image printed at the image area belt portion. This may be due to the greater abrasion of the non-image area belt portion. This also indicates that the gloss of the belt surface has a greater influence on the image gloss. Accordingly, it was confirmed that, when the gloss of the belt surface is degraded due to repeated use of the belt, the gloss of the toner image obtained by using the belt is also degraded.

From the test results above, it was confirmed that, in the gloss-enhancing apparatus, the surface gloss of the endless belt including a release layer using a fluorine-based resin which has been generally used is easily degraded, and that there is a problem of degrading the gloss of the toner image formed by using this belt.

Example 1

An endless belt-shaped polyimide (PI) substrate layer having a diameter of about 80 cm was prepared according to the procedure described in Comparative Example 1.

A coating layer containing an inorganic-organic nanocomposite material in which silica nanoparticles are dispersed in a siloxane polymer matrix was formed on the PI substrate layer according to a ring coating method described below.

First, about 4 g of nano silica particles having an average particle diameter of about 40 nm and about 150 ml of deionized water were added to a 150 ml beaker. About 35 ml of 50% hydrogen peroxide solution was further added to the beaker, and then, the mixed solution was stirred at a temperature of about 40 t to about 50 t for about 20 minutes. Then, the nanosilica particles were filtered, washed with water, and dried at a temperature of about 90 t for about 1 hour, thereby obtaining nanosilica particles having hydroxyl groups formed on the surface thereof.

To a 500 ml beaker, about 150 ml of ethanol and about 5 g of a mixture of about 4.5 g of the nanosilica particles having hydroxyl groups formed on the surface thereof and a silanol compound represented by Formula 1 below, wherein R is $-(CF_2)_2-CF_3$ and $R^a$ is a methol group and the nanosilica particles and the silanol compound were mixed at a molar ratio of 50:50, were added. The reaction mixture thus obtained was stirred at room temperature for about 1 hour to perform a dehydration-condensation reaction. Accordingly, a dispersion having a solid concentration adjusted to be about 8.6 wt % was obtained.

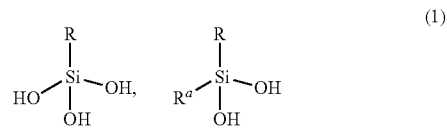

(1)

By using a ring coating method under atmospheric condition, the dispersion was applied on the PI substrate layer, and heat-treated at a temperature of about 150° C. for about 10 minutes to form a release layer consisting of silica nanoparticle-siloxane organic polymer composite materials on the PI substrate layer. Accordingly, an endless belt in which the inorganic-organic nanocomposite material release layer having a thickness of about 10 μm is formed on the surface of the PI substrate layer was prepared.

The endless belt was mounted as the endless belt 210 of the gloss-enhancing apparatus 300 using the non-contact cooling method as shown in FIG. 8. By using the endless belt, the changes in the gloss of the surface of the endless belt were measured under the same conditions as described in the measurement test of the changes in the gloss of the surface of the endless belt surface of FIG. 11.

Figure 13:
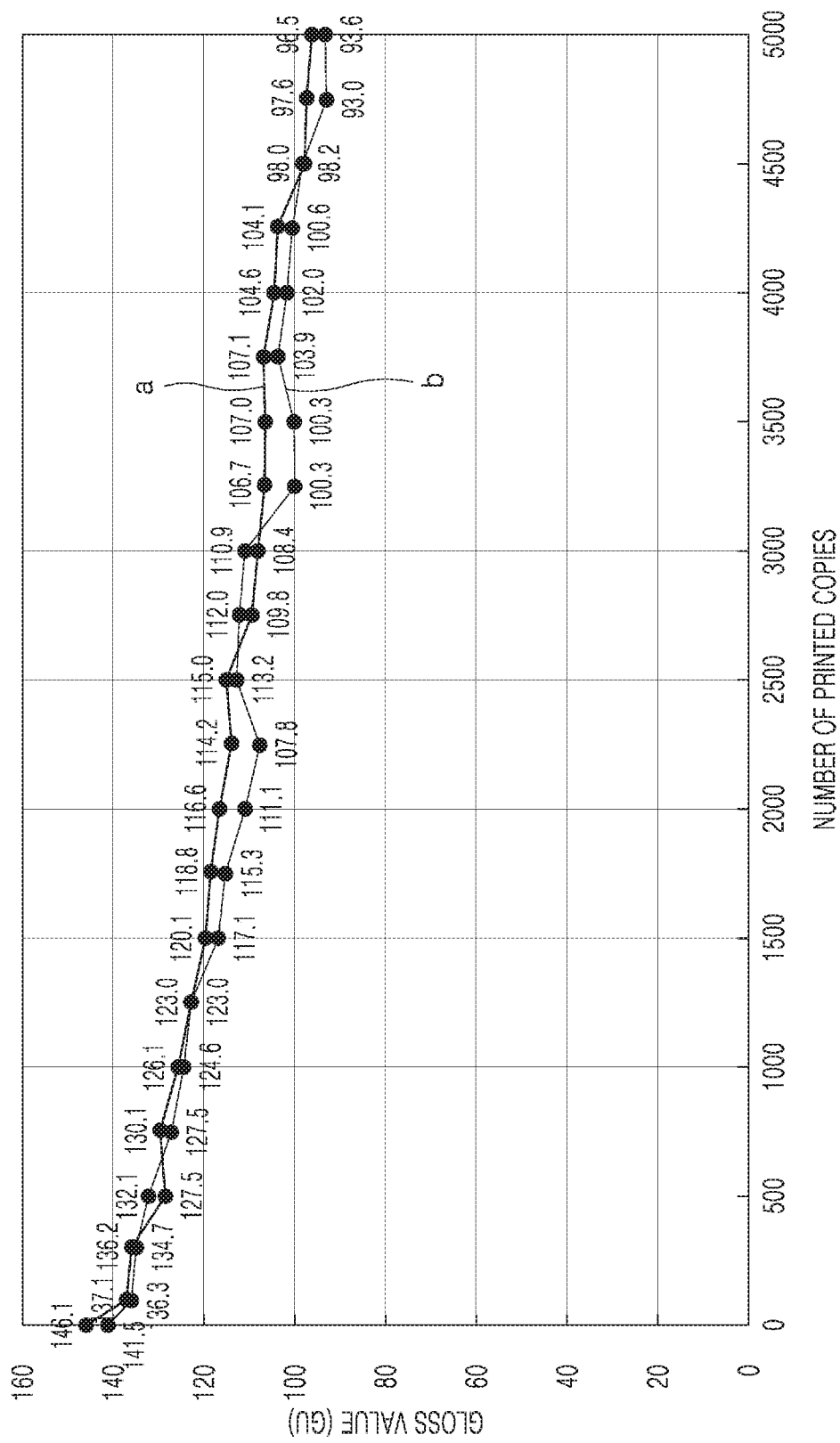
FIG. 13 is a graph showing the results of measuring changes in the gloss of the surface of the endless belt as the number of printed copies increases.

FIG. 13 is a graph showing the results of measuring changes in the gloss of the surface of the endless belt as the number of printed copies increases. In FIG. 13, the curve indicated by "a" shows the changes in the gloss of the surface of the endless belt corresponding to the area (image area) where a 100% solid black image is printed, and the curve indicated by "b" shows the changes in the gloss of the surface of the endless belt corresponding to the blank area (non-image area).

Referring to FIG. 13, the initial gloss value of the belt surface was more than 140 GU, which is more than twice the gloss value of about 70 GU of the belt of Comparative Example 1 in which the PFA release layer was formed. In this regard, it was confirmed that the gloss of the belt surface decreases only slightly as the number of printed copies increases. In addition, it was confirmed that the gloss value of the belt surface (curve a) corresponding to the image area and the gloss value of the belt surface (curve b) corresponding to the non-image area gradually decrease while having almost the same value. Referring to the results above, it was assumed that the coating layer of the belt of the present example including the inorganic-organic nanocomposite material had reduced gloss not by the surface abrasion caused by hard inorganic materials such as calcium carbonate on the recording medium, e.g., A4 paper, but by foreign matters such as toner particles. In particular, in the case of the gloss-enhancing apparatus, the gloss of the belt surface greatly affects the gloss of the output image so that it is important to maintain at least 60 GU of the gloss value of the belt surface. In the case of the belt of the present example, the gloss value of the belt surface was maintained at 90 GU or more, which is much higher than 60 GU, even when printing 5,000 copies. Accordingly, it was confirmed that the belt of the present example including the coating layer consisting of the inorganic-organic nanocomposite material was significantly excellent in abrasion resistance and durability so that the lifespan was much longer than the belt including the PFA release layer.

Next, the changes in the gloss of the toner image printed by using the printer equipped with the gloss-enhancing apparatus were measured with the increased number of printed copies.

Figure 14:
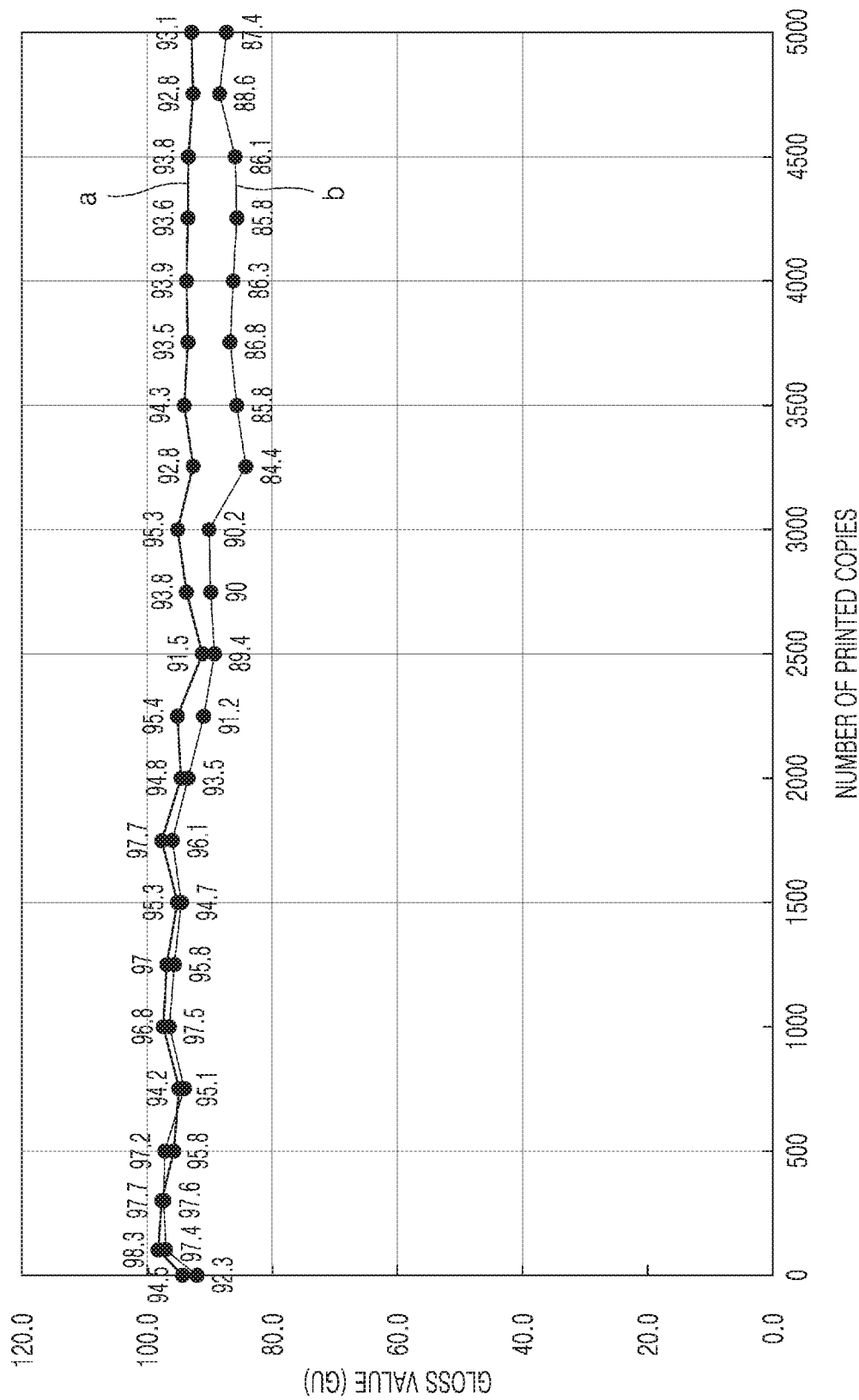
FIG. 14 is a graph showing the results of measuring changes in the gloss of the obtained toner image as the number of printed copies increases.

FIG. 14 is a graph showing the results of measuring changes in the gloss of the obtained toner image as the number of printed copies increases. The test results of FIG. 14 indicate the results of measuring changes in the gloss of the toner image according to the same test methods described in FIG. 12. In FIG. 14, the curve indicated by "a" is a gloss change curve of a toner image printed at the belt portion (i.e., an image area belt portion) through which A4 paper portion with an image area printed thereon was passed, and the curve indicated by "b" is a gloss of a toner image printed at the belt portion (i.e., a non-image area belt portion) through which A4 paper portion with a non-image area printed thereon was passed.

Referring to FIG. 14, it was confirmed that the initial gloss values of the image were greater than those of Comparative Example 1 by 10% or more, and the gloss values of the image slightly decreased even if the number of printed copies increased. Specifically, it was confirmed that, even if the number of printed copies increases, the gloss value of the toner image (curve a) printed at the belt corresponding to the image area and the gloss value of the toner image (curve b) printed at the belt corresponding to the non-image area were almost the same and only slightly decrease. In addition, it was also confirmed that, even if 5,000 copies were printed, the gloss of the image was well maintained to have a value larger than the initial gloss value of the image of Comparative Example 1 (FIG. 12). Referring to the results above, it was confirmed that the belt of the present example including the coating layer consisting of the inorganic-organic nanocomposite material has excellent abrasion resistance and durability, and accordingly, has a much longer lifespan than the belt including the PFA release layer, so that high-gloss and high-quality images were able to be stably provided even if the belt of the present example is used for a long period of time.

It was also confirmed that, since the endless belt of the present disclosure has excellent gloss, abrasion resistance, and releasability, high-gloss and high-gloss images were able to be stably provided for a long period of time when the endless belt of the present disclosure is applied to a gloss-enhancing apparatus and/or a fusing apparatus of an imaging apparatus.

While examples of the present disclosure have been described with reference to the accompanying drawings and examples, these examples are provided for illustrative purposes only, and it will be understood by one of ordinary skill in the art to which the present disclosure pertains that various modifications and other examples equivalent thereto may be made. Thus, the scope of the present disclosure should be defined by the appended claims.

What is claimed is:

1. An endless belt applicable to fusing a toner image or enhancing gloss of a toner image, the endless belt comprising:
    a substrate layer; and
    a release layer formed on the substrate layer,
    wherein the release layer comprises a coating layer comprising an inorganic-organic nanocomposite material in which inorganic nanoparticles are dispersed in a siloxane polymer matrix,
    wherein the inorganic nanoparticles are silica nanoparticles or glass nanoparticles, and the siloxane polymer is a product formed by dehydration and condensation of at least one organosilanol compound represented by Formula 1 and having at least two hydroxyl groups, and which has repeated Si—O—Si linkages, wherein the silica nanoparticles and the siloxane polymer are linked to each other via an ether linkage, —O—:

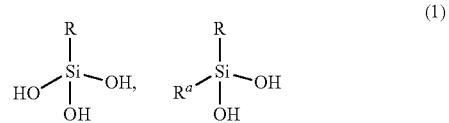

wherein, $R^a$ is a $C_1$-$C_5$ alkyl group or a $C_1$-$C_5$ alkoxy group, R is a monovalent organic group represented by —$(CR_1R_2)$n-$C(R_3)3$, $R_1$, $R_2$, and $R_3$ are each independently —H or —F, and n is an integer from 0 to 20, and wherein the organosilanol compound is at least one of compounds represented by Formula 2:

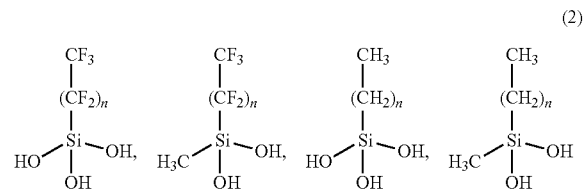

wherein n is an integer from 0 to 20.

2. The endless belt of claim 1, wherein the nanocomposite material is an inorganic-organic nanocomposite material in which the inorganic nanoparticles are covalently linked to the siloxane polymer.

3. The endless belt of claim 1, wherein the inorganic nanoparticles have an average particle diameter of 20 nanometers (nm) to 200 nm.

4. The endless belt of claim 1, wherein the substrate layer comprises at least one polymer selected from a polyimide, a polyamide, and a polyamide-imide.

5. The endless belt of claim 1, wherein the substrate layer comprises at least one metal selected from stainless steel, nickel, and aluminum.

6. The endless belt of claim 1, wherein the endless belt further comprises an elastic layer between the substrate layer and the release layer.

7. The endless belt of claim 6, wherein the elastic layer comprises at least one elastic resin selected from the group consisting of: a fluorinated rubber, a silicone rubber, natural rubber, isoprene rubber, butadiene rubber, nitrile rubber, chloroprene rubber, butyl rubber, an acrylic rubber, a hydrin rubber, a urethane rubber, a polystyrene-based resin, a polyolefin resin, a polyvinyl chloride-based resin, a polyurethane resin, a polyester resin, a polyamide resin, a polybutadiene-based resin, trans-polyisoprene-based resin, and a chlorinated polyethylene-based resin.

8. The endless belt of claim 1, wherein the endless belt is used in a fusing apparatus for forming a toner image fused on a recording medium by heating and pressuring an unfused toner image or is used in a gloss-enhancing apparatus for enhancing the gloss of a fused toner image by heating and cooling a fused toner image that has passed through a fusing process.

9. A fusing apparatus for fusing an unfused image by heating and pressing the unfused image, the fusing apparatus comprising:
   an endless belt that is rotatable;
   a backup member provided outside and in contact with the endless belt to drive the endless belt; and
   a heating device provided inside the endless belt, the heating device to form a fusing nip while facing the backup member and to heat the endless belt in the fusing nip,
   wherein the heating device comprises at least one of:
      a pressing member having a concave recess at a position corresponding to the fusing nip and a heater provided in the recess, or
      a heat source not in direct contact with the endless belt, a metal bracket provided below the heat source to support the heat source, and a pressing member provided between the metal bracket and the endless belt to transmit radiant heat and pressure from the heat source to the endless belt, and
   wherein the endless belt comprises:
      a substrate layer; and
      a release layer formed on the substrate layer,
      wherein the release layer comprises a coating layer comprising an inorganic-organic nanocomposite material in which inorganic nanoparticles are dispersed in a siloxane polymer matrix.

10. A gloss-enhancing apparatus for enhancing the gloss of a toner image that has been fused by passing through a fusing process by heating and cooling the fused toner image, the gloss-enhancing apparatus comprising:
   an endless belt;
   a heating roller provided outside the endless belt and in contact with the endless belt, and to heat the endless belt;
   a backup roller provided inside the endless belt and in contact with the endless belt, and to form a nip while facing the heating roller with the endless belt disposed therebetween and to drive the endless belt;
   a non-heating roller provided inside the endless belt at a distance spaced apart from the backup roller, and to drive the endless belt while forming a closed curve between the backup roller and the non-heating roller; and
   a cooling device provided inside the endless belt and to cool the endless belt that has passed through the nip,
   wherein the endless belt comprises:
      a substrate layer; and
      a release layer formed on the substrate layer,
      wherein the release layer comprises a coating layer comprising an inorganic-organic nanocomposite material in which inorganic nanoparticles are dispersed in a siloxane polymer matrix.

11. The fusing apparatus of claim 9, comprising a thermally conductive plate between the heater provided in the recess and the endless belt.

12. The fusing apparatus of claim 11, wherein a width of the thermally conductive plate is greater than a width of the heater.

13. The fusing apparatus of claim 12, further comprising a lubricant between the thermally conductive plate and the endless belt.

14. The fusing apparatus of claim 9, wherein the nanocomposite material is an inorganic-organic nanocomposite material in which the inorganic nanoparticles are covalently linked to the siloxane polymer.

15. The fusing apparatus of claim 9, wherein the inorganic nanoparticles have an average particle diameter of 20 nanometers (nm) to 200 nm.

16. The fusing apparatus of claim 9, wherein the pressing member provided between the metal bracket and the endless belt comprises:
   an inner holder to support the metal bracket; and
   a nip plate attached to an outer surface of the inner holder.

17. The fusing apparatus of claim 16,
   wherein the inner holder includes:
      a heat-resistant organic polymer,
      a first side wall portion and a second side wall portion that are separated from each other,
      a base portion connecting the first side wall portion to the second side wall portion, and
      a convex portion protruding from an outer surface of at least one of the first side wall portion or the second side wall portion, and
   wherein the nip plate includes at least one of stainless steel, nickel, or aluminum and has a concave portion on an inner surface to correspond to the convex portion of the inner holder.

18. The gloss-enhancing apparatus of claim 10, wherein the nanocomposite material is an inorganic-organic nanocomposite material in which the inorganic nanoparticles are covalently linked to the siloxane polymer.

19. The gloss-enhancing apparatus of claim 10, wherein the inorganic nanoparticles have an average particle diameter of 20 nanometers (nm) to 200 nm.

* * * * *